United States Patent [19]

Martini

[11] Patent Number: 4,487,576
[45] Date of Patent: Dec. 11, 1984

[54] HIGH-TEMPERATURE, HIGH-PRESSURE ARTICLE TREATMENT APPARATUS, AND METHOD

[75] Inventor: Helmut Martini, Weil der Stadt, Fed. Rep. of Germany

[73] Assignee: Robert Bosch GmbH, Stuttgart, Fed. Rep. of Germany

[21] Appl. No.: 461,185

[22] Filed: Jan. 26, 1983

[30] Foreign Application Priority Data

Feb. 12, 1982 [DE] Fed. Rep. of Germany ....... 3204995

[51] Int. Cl.³ .............. F27D 7/00; F27B 5/16; F23G 7/00; F23C 11/04
[52] U.S. Cl. .............................. 432/25; 34/51; 110/237; 431/1; 431/166; 432/200; 432/205
[58] Field of Search ............ 431/1, 166, 167; 34/51; 110/237; 432/205, 206, 200, 25; 29/DIG. 34, DIG. 36, DIG. 42

[56] References Cited

U.S. PATENT DOCUMENTS

| | | | |
|---|---|---|---|
| 1,561,389 | 11/1925 | Wollers | 431/166 |
| 2,269,595 | 1/1942 | Miller | 432/205 |
| 3,897,195 | 7/1975 | Finch | 431/1 |

Primary Examiner—John J. Camby
Attorney, Agent, or Firm—Frishauf, Holtz, Goodman & Woodward

[57] ABSTRACT

To separate combustion within a combustion chamber for deburring or high-temperature, high-pressure article treatment from gas supply valves, the combustion chamber is formed of a dual wall structure, having an outer wall (21) which is telescopically slidable with respect to an inner wall (12). The articles are introduced into the chamber (11) by placing a support plate (14) against the outer wall structure, with the inner wall (12) slightly raised, leaving a gap (23) between the lower edge of the inner wall and the support plate. Gas introduced within the outer wall structure than can pass into the chamber (11) within the inner wall, through said gap. When the requisite volume and pressure of fill gas—typically oxygen and a combustion gas such as hydrogen, methane or the like—is within the chamber, the inner wall (12) is lowered into sealing engagement with the support plate (14), for ignition of the combustible mixture. The inner wall, thus, totally isolates supply ducts and valves from being affected by the explosive pressure.

15 Claims, 3 Drawing Figures

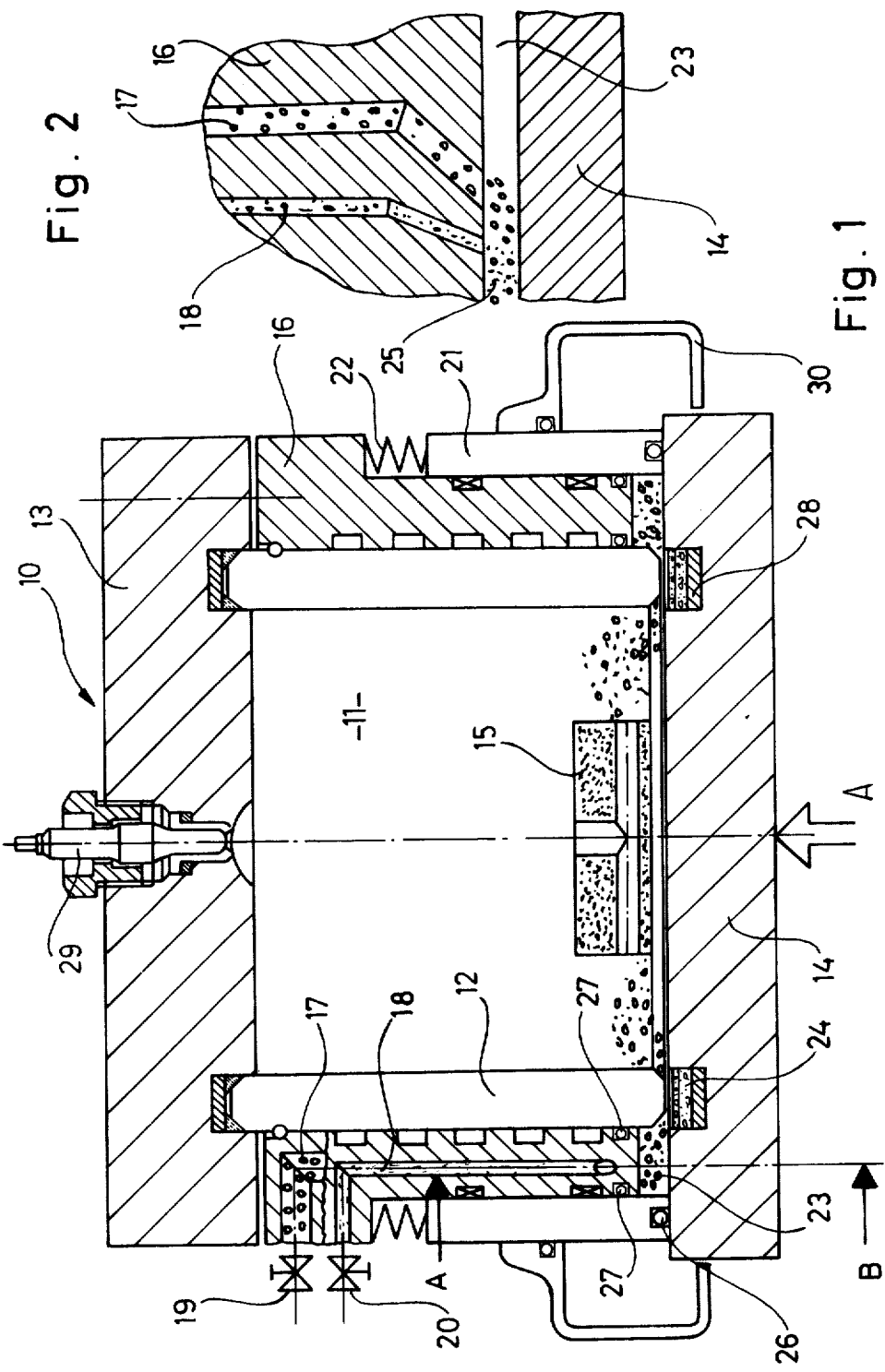

4,487,576

HIGH-TEMPERATURE, HIGH-PRESSURE ARTICLE TREATMENT APPARATUS, AND METHOD

Reference to related applications, assigned to the assignee of the present invention:
U.S. Ser. No. 461,186, filed Jan. 26, 1983, HIEBER et al.
U.S. Ser. No. 461,184, filed Jan. 26, 1983, DREXEL et al.
U.S. Ser. No. 464,904, filed Feb. 8, 1983, DREXEL et al.

The present invention relates to a high-temperature, high-pressure article treatment apparatus, and method of using the apparatus, and more particularly to such an apparatus which is used in explosive thermal deburring.

BACKGROUND

Deburring apparatus in which material to be removed from a workpiece is oxidized or combusted under high thermal and pressure loading is known. A heat and pressure shock is generated by explosively combusting a mixture of oxygen and a combustion gas. The combustion gas may be hydrogen, natural gas, methane, or the like. It is necessary to compress the mixture of gas prior to ignition in order to liberate the necessary energy to remove burrs and similar imperfections from a workpiece. Generally, metering cylinders and gas injection cylinders have been used, in which a piston provides a predetermined quantity of gas, and compresses it, and propels the so compressed gas into the combustion chamber. Mixing and ignition of the combustion gas and the oxygen can be carried out in a separate mixing structure, typically retained within a metal block. Such a mixing block may include a housing in which the mixing chamber as well as an ignition arrangement are located. Such a mixing chamber is then connected over comparatively long ducts, forming gas supply ducts with the gas supply connections to the mixing block. The long gas supply ducts are provided in order to protect the valves which are located between the mixing block and the metering arrangement so that, upon ignition of the highly compressed gases, the valves are not damaged. Combustion temperatures of the gases are in a range of between 2500° C. to 3500° C. The pressure which may occur upon filling of the combustion chamber of the oxygen and combustion gas mixture is in the order of 40 bars.

Apparatus for thermal deburring usually uses a workpiece support plate which forms the lower closing portion of the deburring chamber. A bell-like structure is then placed on the plate, and sealed thereagainst, to define the deburring chamber therein. Sealing between the deburring bell and the closing plate is effected by high pressure, for example by a hydraulically operated structure, e.g. the lever, for example, a double-arm, bent-arm lever. The combustion gas and oxygen mixture is supplied over a mixing chamber in a mixing block.

It has been found that such apparatus, in spite of all precautions taken, results in degradation of the valves since the burning oxygen—fuel mixture, upon ignition, will reach the gas supply valves, separating the gas from the metering apparatus. The high temperatures and pressure occurring during combustion additionally cause wear and degradation of the igniter opening or igniter bore, and the bores and ducts which lead the gases to the deburring chamber.

THE INVENTION

It is an object to so construct and operate a high-temperature, high-pressure apparatus, typically a combustion chamber for deburring apparatus, that the explosion is contained within the chamber itself, eliminating flashback to the valve, supply ducts, and the like.

Briefly, the structure between which the combustion chamber is defined—in combination with a holder plate for the workpiece—for example in essentially bell or inverted cup-like shape, has two essentially cylindrical walls which are telescopically slidable within each other. To introduce gas within the chamber, the inner one of the walls, which is the one within which combustion is to take place, is slightly raised off the bottom plate, that is, the seal therewith is released, and gas is introduced within the outer wall, which is seated on the workpiece support plate, forming an end plate of the chamber. After the chamber has been filled with combustion gases, the second and inner wall is sealingly pressed against the bottom plate, to retain the combustion gases therein and separate the supply ducts which terminate in the inner side of the outer wall from the valve sections, indeed to completely separate the outer wall from the inner wall. Ignition is then effected, for example by a spark discharge of a spark plug, similar to automotive ignition. The chamber is vented by releasing the seal of the inner wall against the plate, and then also the seal of the outer wall with respect to the plate. A suction apparatus, closely surrounding the outer wall, can be provided to prevent escape of combustion gases into the atmosphere and to draw out possibly noxious combustion gases for detoxification and eventual venting after cleaning.

Introduction of the gases within the outer wall can easily be effected by forming an intermediate wall or sleeve between the outer and the inner wall, the intermediate wall having bores therein communicating with the gas supply valves. The intermediate wall may also be used to include cooling ducts therein in order to cool the inner walls defining the combustion chamber.

The apparatus and method has the advantage that the previously utilized mixing block in order to mix the combustion gas and oxygen need no longer be used, since mixing can be carried out directly upon introduction of the respective gases into the combustion chamber. The portions of the apparatus outside of the combustion chamber are completely isolated during combustion from the combusting gases. This is not effected by valves, in accordance with the prior art, since valves, it has been found, cannot withstand the pressures and temperatures arising upon explosive combustion for an appreciable period of time.

The closing system, which may be termed a tandem closing system, readily permits introduction of the gases, for mixing, upon first closing the outer wall against the workpiece support plate. When the chamber defined thereby is filled with the requisite quantity of gas, the inner chamber wall is then caused to be sealed against the workpiece support plate. In accordance with a feature of the invention, the inner and outer walls are slidable in axial direction with respect to each other. Preferably, the structure is essentially cylindrical, with circular cross section. The pressure which occurred upon filling the chamber with gases is, thus, first accepted by the outer wall of the chamber, in combination with the closure plate. The explosive or combustion pressure, however, which occurs upon ignition is entirely accepted by the inner wall. The combustion chamber, thus, is hermetically completely sealed against the accessory apparatus used in the process such as valves, metering valves, supply ducts, and the like.

In accordance with a preferred feature, the outer wall of the chamber is formed as an axially slidable sleeve which can be sealed against the workpiece support plate by mechanical, pneumatic, or hydraulic pressure systems, to seal the outer wall against the plate and permit introduction of the combustion gases. The axial length or height of the outer wall can be comparatively short, since it must bridge only a gap between the inner wall and the closure plate in axial direction to permit the gases to penetrate within the inner wall, the gap then being closed upon combustion. The engagement pressure of the outer chamber wall with respect to the workpiece holding plate can be obtained mechanically, pneumatically or hydraulically. In accordance with a particularly simple and hence preferred arrangement, the outer wall is pressed against the workpiece support plate by compression springs which press the outer wall, formed as a ring or sleeve, against the workpiece support plate.

The apparatus of the present invention is suitable for thermal deburring of workpieces, but is not limited thereto. Apparatus capable of providing high-thermal and high-pressure treatment may have other uses, for example foamed material may be treated thereby (see, for example, German Pat. No. 1,504,096), or continuous porous bodies may be compacted—see, for example, German Pat. No. 2,322,760.

DRAWINGS

FIG. 1 is a schematic cross section through an apparatus for thermal treatment of workpieces;

FIG. 2 is a cross section along line A-B of FIG. 1 in closed position, ready for ignition of the explosive mixture in the chamber, with those elements not necessary for an understanding of the invention shown generally only schematically.

Figure 3:
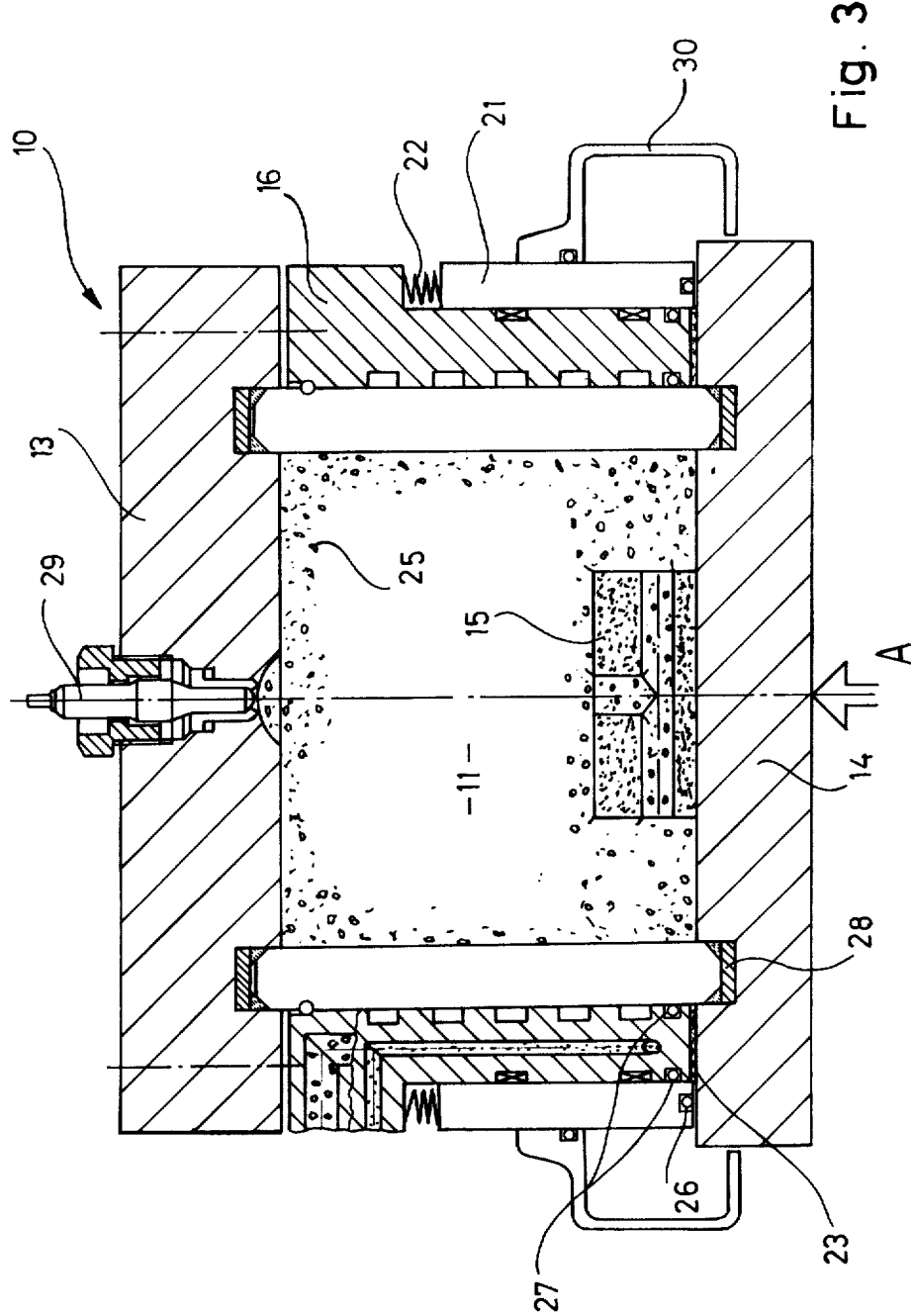

The invention will be described in connection with a thermal deburring apparatus. The deburring apparatus 10—see FIG. 1—is formed by an essentially inverted bell or cup-shaped chamber 11, defined by an inner chamber wall 12, a first, or upper plate or wall portion 13, and a second, or closing plate 14. The workpiece 15 is located on the closing plate. To introduce the workpiece 15 into the chamber, closing plate 14 is separated from the plate 13 and the walls surrounding the workpiece by axial movement, for example by lowering the plate 14. Alternatively, the upper portion including top plate 13 and the side walls may be raised. The inner wall 12 is so arranged and constructed that it can accept the stresses occurring upon ignition of combustion gas and oxygen within the deburring chamber 11. The inner wall 12 can be cooled by a cooling ring 16, surrounding the inner wall 12, and formed with cooling ducts, as well known.

In accordance with a feature of the invention, the cooling ring or cooling sleeve 16 includes supply ducts or bores 17, 18, adapted for connection to a source of oxygen, and combustion gas, respectively. The oxygen is metered and supplied over a valve 19. The combustion gas is metered and supplied over a valve 20. In accordance with a further feature of the invention, an outer chamber wall 21 is provided which is axially slidable with respect to the inner wall 12 and the cooling ring or sleeve 16. A compression spring arrangement 22, which may include a plurality of compression springs or the like is interposed between the outer wall 21 and arranged to bear against the top plate 13. As shown, this arrangement is indirect, via a shoulder formed on the cooling fluid supply duct or sleeve 16.

Operation, with reference to FIGS. 1–3: In a first step, the plate 14 and the wall structure formed by walls 12, 16, 21, and the top plate 13, are axially separated, preferably by dropping the plate 14. A workpiece 15 is placed thereon, and the plate 14 and the deburring chamber walls are then slid towards each other to the extent that the outer wall 21 will be pressed by the springs 22 against the closure plate 14. In this first position, a ring-shaped gap 23 will form within the outer wall 21, the cooling ring 16, the inner wall 12, and the closure plate 14. This gap 23 extends through a sealing depression 24, formed within the plate 14 in which the wall 12 is to engage, upon complete closing, as will appear. The outer wall 21 is sealed against the plate 14 by an O-ring 26.

Oxygen and combustion gas are then admitted through valves 19, 20 and bores 17, 18 into the ring-shaped gap 23, to form a mixture of oxygen and combustion gas. The mixture is schematically indicated at 25—see FIG. 2. Preferably, the gas supply bores are angled in the region of their exit openings to the ring gap 23, in order to provide for intimate mixing of the gas components. The combustion gas—oxygen mixture within the gap 23 then passes through the sealing depression 24 within the deburring chamber 11. Seals 27 prevent escape of the gas to the spaces next to the cooling ring 16. These seals may, for example, O-rings, in accordance with well known constructions.

After filling, additional and substantial pressure is applied against the top and bottom plates 13, 14. FIG. 3 illustrates the thermal deburring apparatus after filling. When the required pressure of the mixture of gases, and the required quantity, has been introduced, pressure, preferably hydraulic pressure, is applied to the closure plate 14. This effects seating of the inner wall 12 against seals 28 within the sealing ring or depression 24. Seals of this type are well known, and can be in accordance with prior art sealing arrangements of deburring chambers. As can readily be seen, the gas supply openings to the valve are now isolated from the interior of the deburring chamber 11. The gas supply openings, and the supply gap 23 through the sealing ring 24, is closed.

Ignition of the combustion gas is effected by a spark gap 29, thus causing deburring of the workpiece 15.

The position illustrated in FIG. 3 illustrates the outer wall 21 securely seated against the plate, by compression of the springs 22. The sleeve 16 is shown slightly spaced from the upper plate 13 for ease of illustration; in actual operation, springs 22 will press the sleeve 16 against the upper plate 13.

The seal 26 between the closure plate 14 and the outer plate 21 need not hold the entire combustion pressure; it must only be capable of sealing the filling pressure upon filling the gases within the deburring chamber. The seal 28 between the inner wall 12 of the chamber and the closure plate 14, however, must be capable of accepting the substantially higher pressures and temperatures which occur during actual deburring of the workpiece. Movement of the closure plate 14, and closing pressure, is schematically indicated by the arrow A, FIGS. 1, 3.

After ignition, the ignition chamber structure and the closure plate 14 are separated, for example by dropping the closure plate 14, thus permitting the residual combusted gases to vent towards the outside. Preferably, a gas suction device 30, in form of a suction shroud, is located essentially surrounding the region of separation between the upper portion of the combustion chamber 11 and the closing plate in order to remove the exhaust gases without environmental contamination.

The height of the cooling and gas supply ring or sleeve is so dimensioned that the gap 23 will be a minimum or very small when the combustion chamber is completely closed, that is, in the position shown in FIG. 3, and when the bottom plate 14 is in closed state. Thus, the amount of gas which is introduced into the structure from the valves, but is not actually utilized during combustion, is negligibly small. This gas, also, will be removed by the suction apparatus 30 upon separation of the plate 14 from the remainder of the structure.

As best seen in FIG. 2, the supply bores for the various components of gases to be introduced in the combustion chamber, typically a combustion gas and oxygen, are so arranged that they face the gap 23, in order to insure intimate mixing within the ring gap 23 when the apparatus is in the position shown in FIG. 1.

The customarily used mixing block, with a special ignition system, can be entirely eliminated. As shown in FIG. 1, the spark gap is preferably so arranged that it is essentially centrally located in the region of the combustion chamber itself. Preferably, a labyrinth path, and a precombustion chamber, is provided between the spark plug and the combustion chamber (not shown) in order to protect the spark plug against excessive heat upon combustion.

Various changes and modifications may be made within the scope of the inventive concept.

I claim:

1. High-temperature, high-pressure article treatment apparatus having
    means forming a combustion chamber in which high-pressure and high-temperature pulses can be generated by explosive ignition of a combustion gas and an oxygen gas, for treatment of workpieces (15) within the chamber (11).
    wherein, in accordance with the invention,
    the chamber forming means comprises
    a tubular inner wall structure (12);
    a tubular outer wall structure (21) surrounding the inner wall structure and telescopically slidable with respect thereto;
    a first end plate (13) sealingly engaging both said wall structures;
    a second end plate (14) movable with respect to said wall structures for independent, selective sealing engagement with the outer wall structure (21) and the inner wall structure (12), respectively;
    and means (17, 18, 19, 20) for introducing combustion gas and oxygen gas within the inner wall structure while the second end plate (14) is in sealing engagement with the outer wall structure and before the inner wall structure is in sealing engagement with the second end plate, to thereby introduce said combustion gases within the chamber (11) defined by the inner wall structure, to permit isolating the chamber (11) defined by the first and second end plates (13, 14) and the inner wall structure (12) from said gas introduction means;
    and ignition means (29) in said chamber (11) to ignite the gases therein while the supply means (17, 18, 19, 20) is isolated from the ignition event within the chamber by the inner chamber wall structure.

2. Apparatus according to claim 1, wherein the inner wall structure and the outer wall structure (12, 21) are spaced from each other;
    and said gas introduction means are located in the space resulting from said separation.

3. Apparatus according to claim 1, including a high-temperature, high-pressure resistance seal (28) formed between the second end plate (14) and said inner wall structure (12) and selectively engageable therewith.

4. Apparatus according to claim 1, including high-pressure applying pressure (A) pressing the second closure plate against the outer wall structure upon application of pressure engaging movement for a first selected distance to effect sealing of the inner wall structure (12) against the second plate (14) upon additional sealing movement and application of further closing pressure.

5. Apparatus according to claim 4, further including compression spring means (22) in engagement with said outer wall structure (21) and axially pressing said outer wall structure in a direction towards said second end plate.

6. Apparatus according to claim 1, further including an intermediate ring or sleeve structure (16) located between the tubular inner wall structure (12) and the tubular outer wall structure (21);
    and wherein said gas introduction means includes gas supply ducts formed in said intermediate ring or sleeve-shaped structure (16).

7. Apparatus according to claim 1, further including an intermediate ring or sleeve-shaped structure located between the tubular inner wall structure (12) and the tubular outer wall structure (21);
    and cooling fluid ducts formed in said intermediate ring or sleeve-shaped structure.

8. Apparatus according to claim 7, wherein said gas introduction means includes gas supply bores formed in said intermediate ring or sleeve-shaped structure.

9. Apparatus according to claim 7, wherein the bores in said intermediate ring or sleeve-shaped structure terminate at the axial end thereof adjacent said second end plate (14).

10. Apparatus according to claim 9, further including connection means communicating with the bores formed in said intermediate ring or sleeve-shaped structure.

11. Apparatus according to claim 10, wherein said second end plate (14) is formed with a ring groove (24), shaped to receive the inner wall structure (12) and effect a high-temperature, high-pressure seal with respect thereto upon engagement of the second end plate with the inner wall structure;
    and wherein, upon selective disengagement, said ring groove provides for communication of the gases within said chamber (11) from said bores in the intermediate ring or sleeve-shaped structure.

12. Apparatus according to claim 1, further including an ignition element (19) located to apply an ignition spark to the gas mixture within said chamber.

13. Apparatus according to claim 1, further including an exhaust gas removal suction shroud located in surrounding relation with respect to the bottom closure plate and the outer wall structure to suck off combusted gases upon severing of the second end plate (14) from said wall structures (12, 21) after combustion.

14. Method of applying high-temperature, high-pressure shocks to an article within an article treatment chamber comprising the steps of locating said article on a support end plate (14);

placing a tubular-bell-shaped chamber forming wall including an outer wall structure (21) over said end support plate (14) to thereby separate said chamber from the outer atmosphere;

positioning an inner wall structure within the outer wall structure;

separating the inner wall structure from the support plate (14) by a gap (23);

introducing combustion gases and oxygen gas within the outer wall structure (21), and conducting said gas through said gap (23) within the chamber (11);

and then closing the inner wall structure (12) and sealing the inner wall structure against the support plate to sever connections of gas supply from the chamber;

and igniting the combustion gases and oxygen within the chamber.

15. Method according to claim 14, wherein said inner wall structure (12) and said outer wall structure (21) are concentric, telescopically relatively slidable cylindrical structures;

and the step of introducing said combustion gases and oxygen gas comprises introducing said combustion and oxygen gases interiorly of said outer wall structure (21) while the tubular inner wall structure is telescopically raised with respect to the outer wall structure (21) to thereby define said gap;

and including the step of then sealing the inner wall structure (12) against said support plate (14) by introducing the inner wall structure within a sealing groove (24), thus interrupting said gap (23) by telescopic sliding movement of said wall structures axially with respect to each other.

* * * * *